(12) United States Patent
Niina

(10) Patent No.: US 9,415,933 B2
(45) Date of Patent: Aug. 16, 2016

(54) ARTICLE STORAGE DEVICE AND ARTICLE TRANSFER METHOD

(75) Inventor: Shinya Niina, Tokyo (JP)

(73) Assignee: IHI CORPORATION (JP)

( * ) Notice: Subject to any disclaimer, the term of this patent is extended or adjusted under 35 U.S.C. 154(b) by 0 days.

(21) Appl. No.: 13/988,874

(22) PCT Filed: Dec. 13, 2011

(86) PCT No.: PCT/JP2011/078804
§ 371 (c)(1),
(2), (4) Date: May 22, 2013

(87) PCT Pub. No.: WO2012/081579
PCT Pub. Date: Jun. 21, 2012

(65) Prior Publication Data
US 2013/0243551 A1    Sep. 19, 2013

(30) Foreign Application Priority Data
Dec. 16, 2010 (JP) .................................. 2010-280341

(51) Int. Cl.
*B65G 65/00* (2006.01)
*B65G 1/04* (2006.01)

(52) U.S. Cl.
CPC ............ *B65G 1/0407* (2013.01); *B65G 1/0414* (2013.01)

(58) Field of Classification Search
CPC ....... B65G 7/00; B65G 63/002; B65G 1/0407
USPC .......................................... 414/277, 278, 284
See application file for complete search history.

(56) References Cited

U.S. PATENT DOCUMENTS

| 6,113,336 A | * | 9/2000 | Chang et al. ............ | 414/281 |
| 6,913,434 B1 | * | 7/2005 | Mannikko ............ | 414/802 |
| 2006/0285947 A1 | * | 12/2006 | Hansl et al. ............ | 414/277 |

FOREIGN PATENT DOCUMENTS

| JP | 63-024106 | 2/1988 |
| JP | 63-277106 | 11/1988 |
| JP | 3-078325 | 12/1991 |
| JP | 6-321316 | 11/1994 |

OTHER PUBLICATIONS

International Search Report and Written Opinion mailed Jan. 17, 2012 in corresponding PCT International Application No. PCT/JP2011/078804.

* cited by examiner

*Primary Examiner* — Saul Rodriguez
*Assistant Examiner* — Willie Berry, Jr.
(74) *Attorney, Agent, or Firm* — Ostrolenk Faber LLP

(57) ABSTRACT

The article storage device (1) includes a warehouse (2) including racks (21) to store articles (A), a cage (4) suspended from a crane (3) so as to go up and down, and a carriage (5) disposed on the cage (4). The cage (4) includes outriggers (6) capable of extending and retracting to the racks (21) and of being engaged with the racks (21). The racks (21) each include first engagement portions (7) disposed at portions with which the outriggers (6) are engaged, and a second engagement portion (8) disposed adjacent to one first engagement portion (7) in an extending and retracting direction of the outriggers (6). The second engagement portion (8) is capable of positioning one outrigger (6). One outrigger (6) is engaged with the second engagement portion (8) disposed in a side to which the carriage (5) travels, and the other outriggers (6) are engaged with the first engagement portions (7).

10 Claims, 14 Drawing Sheets

US 9,415,933 B2

ARTICLE STORAGE DEVICE AND ARTICLE TRANSFER METHOD

CROSS-REFERENCE TO RELATED APPLICATIONS

The present application is a 35 U.S.C. §§371 national phase conversion of PCT/JP2011/078804, filed Dec. 13, 2011, which claims priority to Japanese Patent Application No. 2010-280341, filed Dec. 16, 2010, the contents of which are incorporated herein by reference. The PCT International Application was published in the Japanese language.

TECHNICAL FIELD

The present invention relates to an article storage device and an article transfer method that automate the loading and unloading of articles, and particularly relates to an article storage device and an article transfer method that are suitable for the storage or transfer of heavy articles.

BACKGROUND ART

For example, as a device suitable for the transfer of heavy articles, a transfer device described in Japanese Examined Patent Application, Second Publication No. H03-78325, is proposed already. In the transfer device described in Japanese Examined Patent Application, Second Publication No. H03-78325, a carriage is movable on rails on a lifting table of a stacker crane, other rails capable of moving the carriage communicating with the rails of the lifting table and being provided in each storage portion of a warehouse, and a support for articles is provided on the carriage through lifting cylinders capable of lifting and lowering the articles. In addition, in the transfer device, a rack gear or a chain is fixed to the carriage along a side surface thereof, and pinions or sprocket wheels capable of being engaged with the rack gear or the chain and drive units thereof are provided in the lifting table at at least the front and back positions of the carriage.

In the transfer device, positioning pins to accurately position the lifting table with respect to the warehouse are provided in the lifting table at the front, back, left and right positions thereof so as to be capable of protruding and retracting in the direction toward the warehouse by cylinder units. The positioning pins are engaged with an upper surface or the like of the bottom of the storage portion in the warehouse, thereby performing the positioning of the lifting table. In Japanese Examined Patent Application, Second Publication No. H03-78325, it is described that engagement parts with which the positioning pins are engaged may be further provided in the storage portion.

A conveyance system including a positioning mechanism to position a handling mechanism (transfer device) with respect to a storage rack when transferring articles is also proposed (for example, see Japanese Unexamined Patent Application, First Publication No. H06-321316). The positioning mechanism described in Japanese Unexamined Patent Application, First Publication No. H06-321316, includes leg members disposed at the four corners of a frame of the handling mechanism so as to be capable of moving between a laterally-protruding state and a non-protruding state, and an operating device to operate the leg members. When the leg members are in the non-protruding state, the handling mechanism is permitted to go up and down. When the leg members are in the protruding state, the handling mechanism can be engaged with the storage racks in both sides. In addition, Japanese Unexamined Patent Application, First Publication No. H06-321316, discloses an embodiment in which each leg member includes a positioning surface having a triangular cross-sectional shape (V-shape) formed in a tapered shape, each storage rack includes a depressed part capable of being fitted to the positioning surface, and the positioning surface of the leg member is guided by the depressed part of the storage rack when positioning the handling mechanism.

SUMMARY OF INVENTION

Technical Problem

As described in the above Japanese Examined Patent Application, Second Publication No. H03-78325, in the transfer device to transfer heavy articles by moving the carriage between the rails of a crane (lifting table) and the rails of the storage portion, the positioning of rails when transferring articles is important. However, in the transfer device described in Japanese Examined Patent Application, Second Publication No. H03-78325, though there are descriptions about the positioning pins, there are no concrete descriptions. For example, when transferring heavy articles heavier than 5 to 10 tons, the load on rails becomes great. Thereby, if accurate positioning is not performed, problems may occur in that the carriage cannot travel, the rails or the carriage are damaged, and the like. Therefore, the positioning of rails is an important element.

In the positioning mechanism described in the above Japanese Unexamined Patent Application, First Publication No. H06-321316, since performing positioning between the leg members disposed at the four corners of the frame and the storage racks disposed in both sides of the handling mechanism (transfer device) is needed, attachment accuracy of the leg member and the depressed part is required. Particularly, since the storage racks are not always disposed right in front of each other, each of individually different attachment positions of the storage racks has to be adjusted. Thus, great time and effort may be required for disposing the positioning mechanism.

In a case where the positioning mechanism is applied to the transfer device for heavy articles described in Japanese Examined Patent Application, Second Publication No. H03-78325, if the accuracy of the positioning mechanism is not secured, position gaps of rails (non-uniformity in the vertical direction, the horizontal direction, or the inclination of rails) may be caused. Thereby, problems may occur in that the carriage cannot travel, the rails or the carriage are damaged, and the like.

The present invention has been made in view of the above problems, and aims to provide an article storage device and an article transfer method that are capable of easily performing the positioning of rails and are suitable for the storage or transfer of heavy articles.

Solution to Problem

According to a first aspect of the present invention, an article storage device includes a warehouse including storage racks to store articles, a crane configured to be capable of moving along the warehouse, a cage suspended from the crane so as to be capable of going up and down, and a carriage disposed on the cage so as to be capable of traveling between the cage and the storage racks. In the article storage device, the cage includes outriggers configured to be capable of extending and retracting with respect to the storage racks and to be capable of being engaged with the storage racks. Each of the storage racks includes first engagement portions disposed at portions with which the outriggers are engaged, and a second engagement portion disposed adjacent to one of the first engagement portions in an extending and retracting direction of the outriggers. The second engagement portion is configured to be capable of positioning one of the outriggers. The article storage device is configured so that one of the outriggers is engaged with the second engagement portion disposed in a side to which the carriage travels, and the other outriggers are engaged with the first engagement portions.

The cage may be configured to be capable of going up and down between masts constituting pillars of the crane, and may include guide rollers configured to be capable of contacting the masts and to be capable of being separated from the masts. The guide rollers may be separated from the masts when one of the outriggers is positioned to the second engagement portion.

Each of the guide rollers may include a roller capable of rotating in a state of contacting one of the masts, an arm supporting the roller rotatably, a supporting member rotatably supporting an end portion of the arm in the opposite side to the roller, and a drive unit to pivot the arm between a contacting position and a separated position of the roller.

A wheel may be disposed at each tip of the outriggers, and one of the outriggers may be configured to be engaged with each of one first engagement portion and the second engagement portion through the wheel.

The second engagement portion may include a V-shape groove capable of positioning one of the outriggers.

The first engagement portions may be configured so that a height position of one of the outriggers positioned to the second engagement portion is the same as height positions of the others of the outriggers placed on the first engagement portions.

According to a second aspect of the present invention, an article transfer method is a transfer method for articles in an article storage device that includes a warehouse including storage racks to store articles, a crane configured to be capable of moving along the warehouse, a cage suspended from the crane so as to be capable of going up and down, and a carriage disposed on the cage so as to be capable of traveling between the cage and the storage racks. The cage includes outriggers configured to be capable of extending and retracting with respect to the storage racks and to be capable of being engaged with the storage racks. Each of the storage racks includes first engagement portions disposed at portions with which the outriggers are engaged, and a second engagement portion disposed adjacent to one of the first engagement portions in an extending and retracting direction of the outriggers. The second engagement portion is configured to be capable of positioning one of the outriggers. The article transfer method includes a cage stop step of stopping the cage at a position above a storage rack to which an article is transferred, an outrigger extension step of extending the outriggers so that one of the outriggers in a side to which the carriage travels is placed on the second engagement portion and the other outriggers are placed on the first engagement portions, an outrigger engagement step of lowering the cage and of placing the outriggers on the first engagement portions and the second engagement portion, thereby engaging the outriggers with the storage racks, and a carriage movement step of making the carriage travel and of moving the carriage to the storage rack. The article is transferred between the cage and the storage rack by movement of the carriage.

The cage may be configured to be capable of going up and down between masts constituting pillars of the crane, and may include guide rollers configured to be capable of contacting the masts and to be capable of being separated from the masts. The article transfer method may further include a guide roller retraction step, before or after the outrigger extension step, of separating the guide rollers from the masts.

Effects of Invention

According to the article storage device and the article transfer method related to the present invention described above, since the positioning is performed by one of the outriggers which extend in the direction toward which the carriage travels and the other outriggers are not held when performing the positioning, the cage as a whole is positioned with respect to the storage rack by positioning one of the outriggers. Therefore, the rails of the cage and the rails of the storage rack can be easily positioned with respect to each other. Consequently, even when articles to be stored are heavy articles, the articles can be transferred smoothly, and the article storage device and the article transfer method suitable for the storage or transfer of heavy articles can be provided.

In a case where the cage includes the guide rollers capable of contacting the masts, the guide rollers can be retracted so as to be separated from the masts when positioning the cage. Therefore, when the outriggers are positioned, the cage is not held by the masts or the guide rollers, and thereby the positioning of the cage can be performed easily.

DESCRIPTION OF EMBODIMENTS

Figure 1:
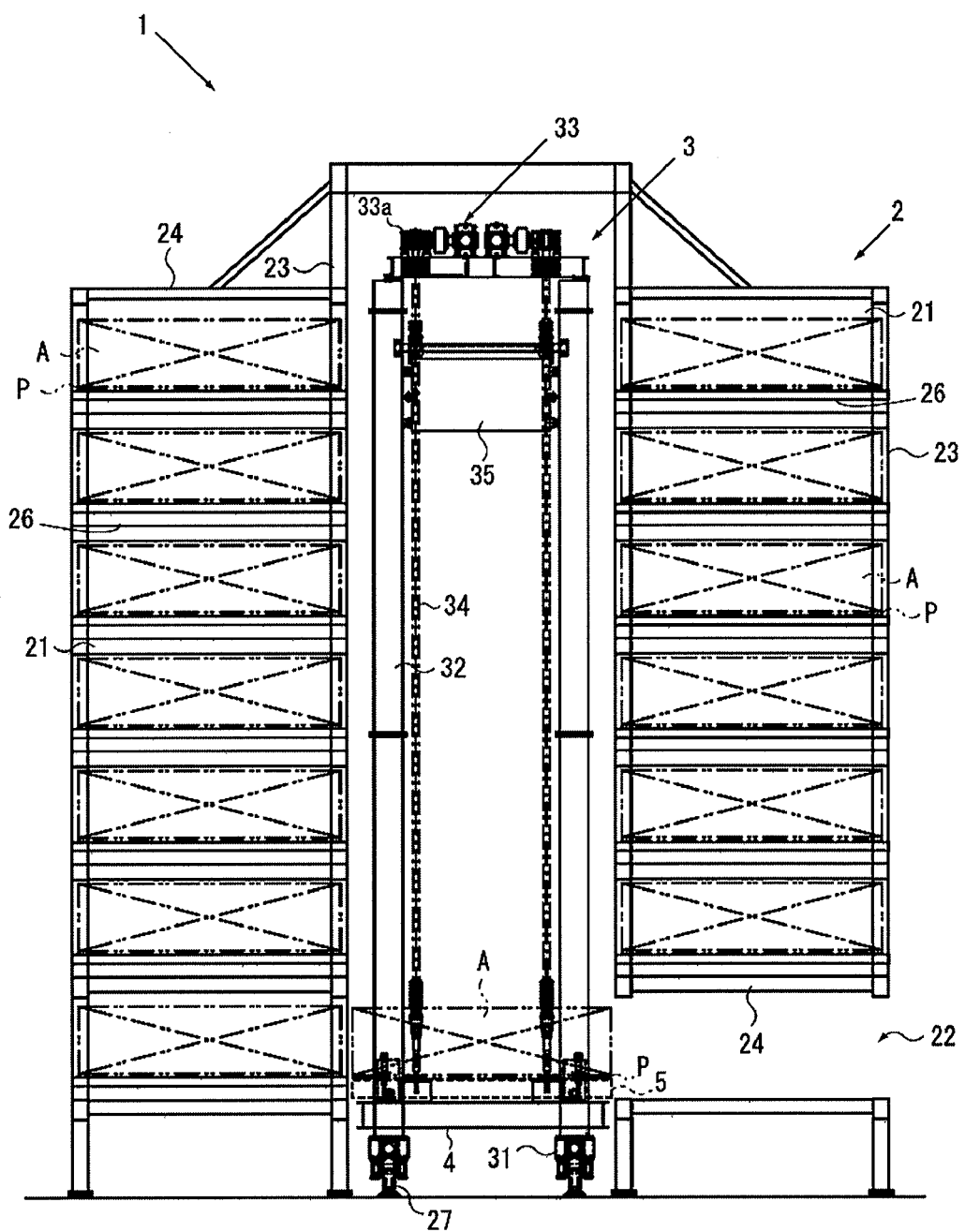
FIG. 1 is a schematic overall structural diagram of an automatic warehouse including an article storage device related to a first embodiment of the present invention.
Figure 2:
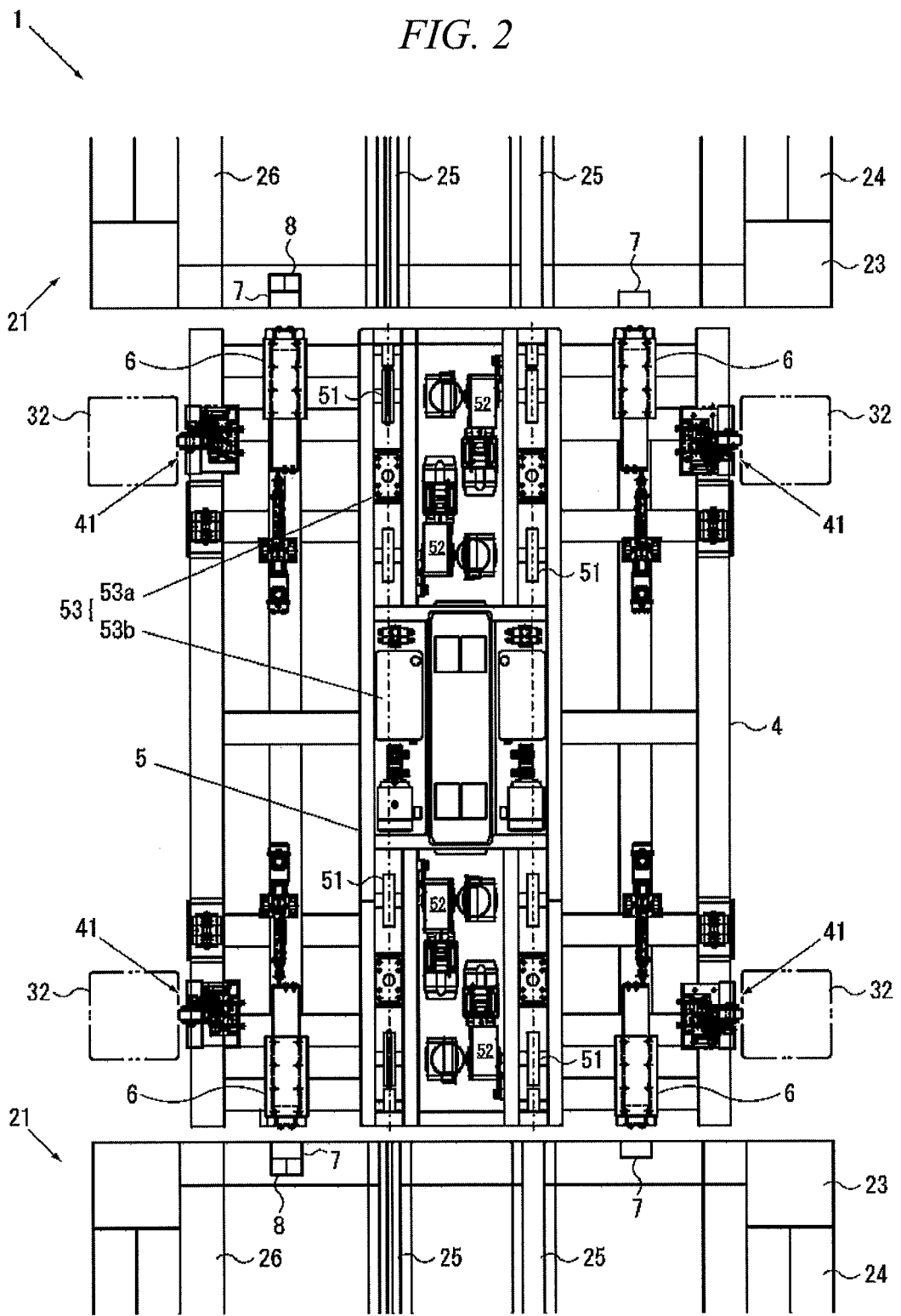
FIG. 2 is a plan view of the article storage device shown in FIG. 1.
Figure 3A:
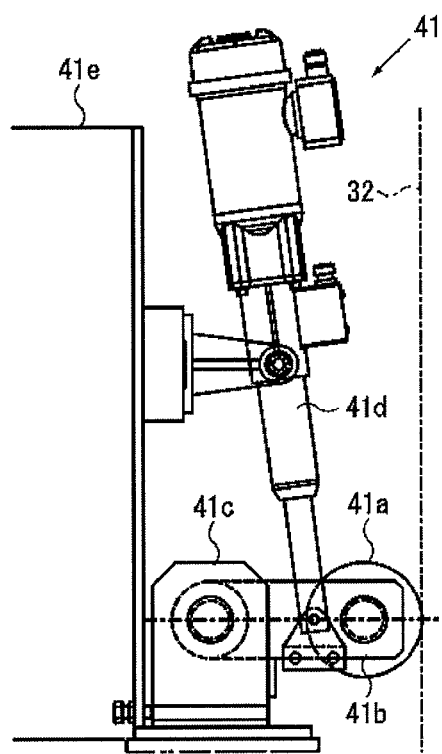
FIG. 3A is a side view showing a contacting state of a guide roller shown in FIG. 2.
Figure 3B:
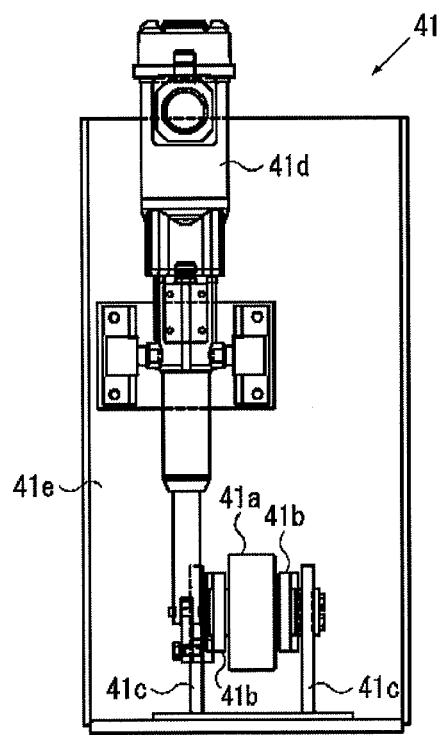
FIG. 3B is a front view showing the contacting state of the guide roller shown in FIG. 2.
Figure 3C:
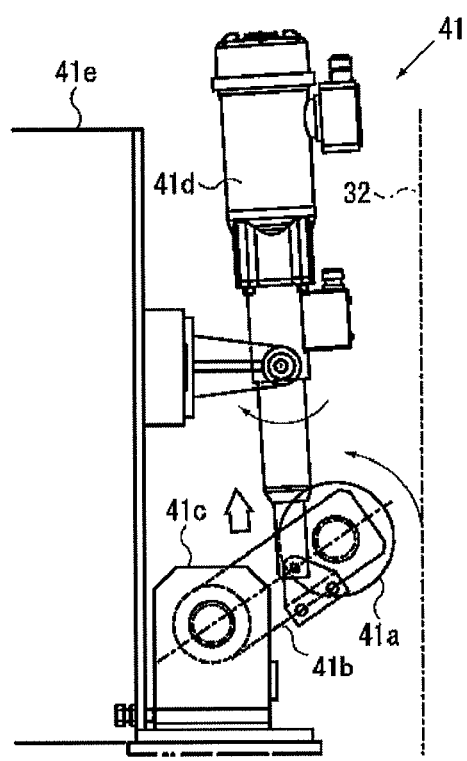
FIG. 3C is a side view showing a retracted state of the guide roller shown in FIG. 2.
Figure 4A:
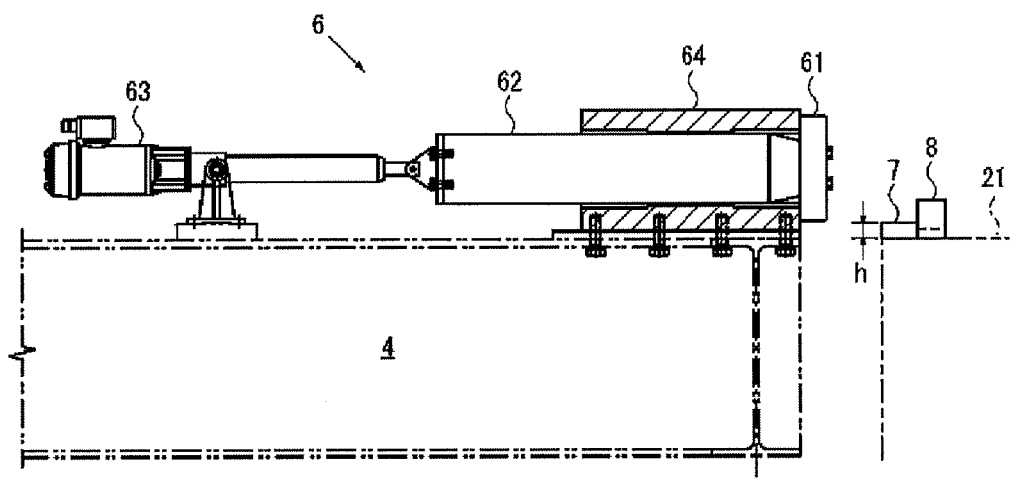
FIG. 4A is a side view with a partial cross-section showing a state in which an outrigger shown in FIG. 2 is retracted.
Figure 4B:
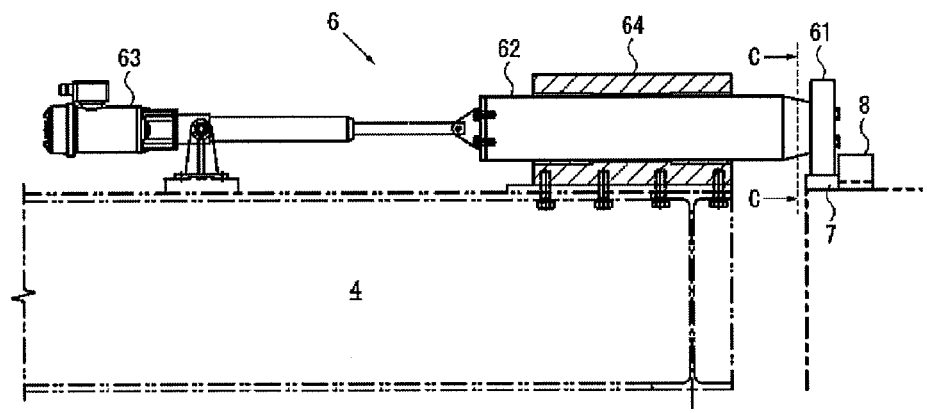
FIG. 4B is a side view with a partial cross-section showing a state in which the outrigger shown in FIG. 2 is extended to a first engagement portion.
Figure 4C:
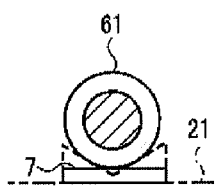
FIG. 4C is a cross-sectional view along line C-C seen from arrows in FIG. 4B.
Figure 4D:
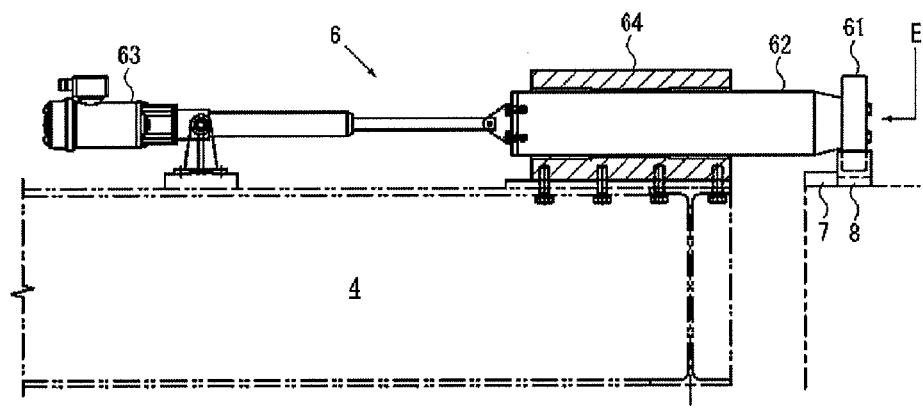
FIG. 4D is a side view with a partial cross-section showing a state in which the outrigger shown in FIG. 2 is extended to a second engagement portion.
Figure 4E:
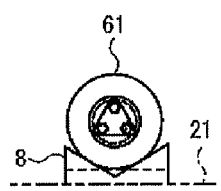
FIG. 4E is a view seen from an arrow E in FIG. 4D.

An article storage device related to a first embodiment of the present invention is described below with reference to FIGS. 1 to 4E. FIG. 1 is a schematic overall structural diagram of an automatic warehouse including an article storage device related to the first embodiment of the present invention. FIG. 2 is a plan view of the article storage device shown in FIG. 1. FIG. 3A is a side view showing a contacting state of a guide roller shown in FIG. 2. FIG. 3B is a front view showing the contacting state of the guide roller shown in FIG. 2. FIG. 3C is a side view showing a retracted state of the guide roller shown in FIG. 2. FIG. 4A is a side view with a partial cross-section showing a state in which an outrigger shown in FIG. 2 is retracted. FIG. 4B is a side view with a partial cross-section showing a state in which the outrigger shown in FIG. 2 is extended to a first engagement portion. FIG. 4C is a cross-sectional view along line C-C seen from arrows in FIG. 4B. FIG. 4D is a side view with a partial cross-section showing a state in which the outrigger shown in FIG. 2 is extended to a second engagement portion. FIG. 4E is a view seen from an arrow E in FIG. 4D.

As shown in FIGS. 1 and 2, an article storage device 1 related to the first embodiment of the present invention includes a warehouse 2 including storage racks 21 to store articles A, a crane 3 configured to be capable of moving along the warehouse 2, a cage 4 suspended from the crane 3 so as to be capable of going up and down, and a carriage 5 disposed on the cage 4 so as to be capable of traveling between the cage 4 and the storage racks 21. The cage 4 includes outriggers 6 configured to be capable of extending and retracting with respect to the storage racks 21 and to be capable of being engaged with the storage racks 21. The storage racks 21 each include first engagement portions 7 disposed at portions with which the outriggers 6 are engaged, and a second engagement portion 8 disposed adjacent to one of the first engagement portions 7 in an extending and retracting direction of the outriggers 6. The second engagement portion 8 is configured to be capable of positioning one of the outriggers 6. The article storage device 1 is configured so that one of the outriggers 6 is engaged with the second engagement portion 8 disposed in the side to which the carriage 5 travels, and the others of the outriggers 6 are engaged with the first engagement portions 7.

As shown in FIG. 1, the article storage device 1 related to this embodiment is applied to a so-called automatic warehouse. An article A is a die as a heavy article heavier than 5 to 10 tons (for example, about 40 to 50 tons). The die detached from a pressing machine is transferred to a loading-unloading station 22 of the article storage device 1 through a die exchanger, a conveyance carriage, a crane or the like, and the die is transferred to the carriage 5 therefrom. The carriage 5 on which the article A is loaded is transferred to the front of a storage rack 21 by the movement of the crane 3 and the cage 4, and transfers the article A to the storage rack 21, thereby storing the article A. In addition, when a die (article A) is required, an empty carriage 5 is transferred to the front of the storage rack 21 to which the die (article A) is stored, the article A is transferred to the carriage 5 from the storage rack, and is transferred to the loading-unloading station 22. The die is transferred to the die exchanger, the conveyance carriage, the crane or the like therefrom, and is provided to the pressing machine. In addition, the article A is not limited to the die, and may be another heavy article such as steel materials, steel plates, various parts, and various products.

For example, as shown in FIGS. 1 and 2, the warehouse 2 includes the storage racks 21 arranged to be multistory and high-rise. The multistory and high-rise storage racks 21 are disposed in the traveling direction of the crane 3 in parallel, thereby constituting the warehouse 2. In addition, the warehouse 2 is a frame structure composed of, for example, pillars 23 and side frames 24. Each of the storage racks 21 includes rails 25 disposed in the frame structure so as to support the carriage 5 movably, and a supporting member 26 capable of supporting both side parts of a palette P on which the article A is placed. The storage racks 21 are disposed at both sides between which the crane 3 is interposed, and are often configured so that one crane 3 can transfer the articles A to each of the storage racks 21. Rails 27 are laid at the portion in which the crane 3 travels between the storage racks 21. In addition, the structure of the warehouse 2 and the storage racks 21 is merely one example, the present invention is not limited to the structure shown in the drawings, and various structures conventionally used can be adopted. Particularly, when the articles A are heavy articles, the warehouse 2 does not have to be configured to be multistory and high-rise, and may be configured to be a single story or low-rise.

The crane 3 includes, for example, a travelling device 31 capable of travelling on the rails 27, masts 32 erected at the four corners of the travelling device 31, a lift drive unit 33 disposed at the top of the masts 32, a chain 34 wound around a chain sprocket 33a of the lift drive unit 33, and a counterweight 35 connected to one end of the chain 34. The cage 4 is connected to the other end of the chain 34. By this structure, the crane 3 can be horizontally moved along the rails 27, and the lift drive unit 33 can rotate the chain sprocket 33a, thereby making the cage 4 go up and down optionally. Accordingly, the cage 4 can be transferred to any storage rack 21. In addition, the structure of the crane 3 is merely one example, the present invention is not limited to the structure shown in the drawings, and various structures conventionally used can be adopted.

As shown in FIG. 1, the cage 4 is suspended by the chain 34 of the crane 3 so as to be capable of going up and down. As shown in FIG. 2, the cage 4 is, for example, a frame structure composed of a plurality of frames. In addition, the cage 4 is configured to be capable of going up and down between the masts 32 constituting pillars of the crane 3, and includes guide rollers 41 configured to be capable of contacting the masts 32 and to be capable of being separated from the masts 32. The guide rollers 41 are disposed between the masts 32, and are capable of contacting the inner surfaces of the masts 32.

As shown in FIGS. 3A to 3C, each of the guide rollers 41 includes a roller 41a capable of rotating in a state of contacting one of the masts 32, an arm 41b supporting the roller 41a rotatably, a supporting member 41c rotatably supporting an end portion of the arm 41b on the opposite side of the arm 41b from the side of the arm 41b which supports the roller 41a, and a drive unit 41d to pivot the arm 41b between a contacting position and a separated position of the roller 41a to the mast 32. As shown in FIG. 3B, the supporting member 41c is composed of a pair of plate members erected on the cage 4. The arm 41b is composed of a pair of plate members connected to the supporting member 41c by a pin. The roller 41a is connected to an end of the arm 41b by a pin. By this structure, the roller 41a is rotatably supported by the arm 41b, and the arm 41b is supported by the supporting member 41c so as to be capable of moving rotationally.

The drive unit 41d is, for example, an actuator swingably supported by a supporting frame 41e erected on the cage 4. As the drive unit 41d, for example, an actuator such as a hydraulic cylinder, a pneumatic cylinder, and an electric cylinder can be selected optionally and used. The tip of the drive unit 41d is connected to the arm 41b through a fixing member connected by a pin. Thus, as shown in FIGS. 3A and 3C, by extending and retracting the actuator, the arm 41b can be pivoted, and the position of the roller 41a can be changed between the contacting position shown in FIG. 3A and the separated (retracted) position shown in FIG. 3C.

In this way, the drive unit 41d is disposed over the arm 41b and the like, whereby the confined plane of the cage 4 can be utilized efficiently, and the position of the roller 41a can be changed in a small installation area. In addition, when causing the roller 41a to contact the mast 32, even if there is no sufficient space between the mast 32 and the roller 41a, the roller 41a can be pushed thereinto from above, and while adjusting the position of the cage 4, the roller 41a can be reliably disposed at the contacting position. In addition, the structure of the guide roller 41 is not limited to the structure shown in the drawings. For example, the roller 41a may be rotatably disposed at the tip of the drive unit 41d, the drive unit 41d may be disposed so as to be capable of extending and retracting in the perpendicular direction to the mast 32, and the position of the roller 41a may be horizontally changed between the contacting position and the separated (retracted) position by extending and retracting the drive unit 41d.

As shown in FIG. 2, the cage 4 includes a pair of outriggers 6 disposed so as to be capable of extending and retracting with respect to the storage rack 21 facing the cage. In this embodiment, since the storage racks 21 are disposed at the both sides of the cage 4, two pairs of outriggers 6 (four outriggers) are disposed on the cage 4.

As shown in FIGS. 4A to 4E, a wheel 61 is disposed at the tip of each outrigger 6, and the outrigger 6 is configured to be engaged with each of one first engagement portion 7 and the second engagement portion 8 through the wheel 61. Specifically, the outrigger 6 includes the wheel 61, a supporting member 62 supporting the wheel 61 rotatably, a drive unit 63 to slide the supporting member 62, and a guide member 64 to guide the slide of the supporting member 62. The supporting member 62 is, for example, a steel member such as a square column and a circular column. In addition, the guide member 64 is, for example, a tubular member through which the supporting member 62 can pass. The drive unit 63 is, for example, an actuator such as a hydraulic cylinder, a pneumatic cylinder, and an electric cylinder disposed on the cage 4. By extending and retracting the drive unit 63, the position of the wheel 61 can be optionally changed between the retracted state shown in FIG. 4A, the extended state shown in FIG. 4B, and the extended state shown in FIG. 4D. In addition, the wheel 61 is provided in the supporting member 62 rotatably around the axis extending in the extending and retracting direction of the outrigger 6.

As shown in FIGS. 2 and 4A, the first engagement portions 7 and the second engagement portion 8 are disposed on the upper surface of the storage rack 21. In a state where the guide rollers 41 contact the masts 32, the first engagement portions 7 and the second engagement portion 8 are disposed at the positions facing the outriggers 6. As shown in FIGS. 2 and 4C, the first engagement portion 7 is a flat plate member in which the upper surface thereof is formed approximately evenly, and is disposed so as to correspond with each outrigger 6. That is, a pair of first engagement portions 7 are provided in each storage rack 21, and are disposed so as to correspond with the pair of outriggers 6 of the cage 4. In the first engagement portion 7, the upper surface thereof is formed approximately evenly in order to permit the movement of the wheel 61 of the outrigger 6 in the horizontal direction (the movement in the horizontal direction orthogonal to the extending and retracting direction of the outrigger 6). In other words, the first engagement portion 7 is configured so that the wheel 61 of the outrigger 6 can be engaged therewith in the vertical direction (capable of regulating the downward movement of the wheel 61), and is capable of positioning the outrigger 6 in only the vertical direction.

As shown in FIGS. 2 and 4E, the second engagement portion 8 is a flat plate member including a V-shape groove capable of positioning the wheel 61 of the outrigger 6, and is disposed adjacent to one of the first engagement portions 7 in each storage rack 21. The wheel 61 of the outrigger 6 is placed into the V-shape groove of the second engagement portion 8 from above, thereby regulating both of the movement of the wheel 61 in the horizontal direction (the movement in the horizontal direction orthogonal to the extending and retracting direction of the outrigger 6), and the downward movement of the wheel 61 in the vertical direction. In other words, the second engagement portion 8 is configured so that the wheel 61 can be engaged therewith in the vertical and horizontal directions, and is capable of positioning the outrigger 6 in the vertical and horizontal directions. The V-shape groove of the second engagement portion 8 only has to be formed in a shape capable of regulating the movement of the wheel 61, and for example, a U-shape groove or a rectangular groove may be adopted.

Figure 5A:
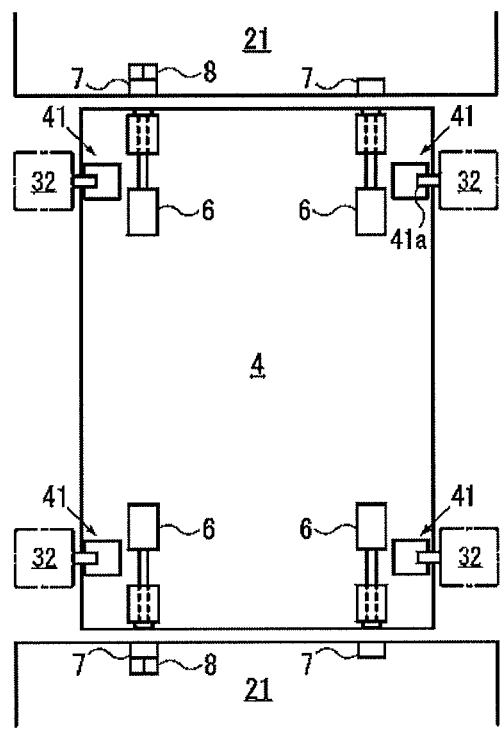
FIG. 5A is a diagram showing a cage stop step in a cage positioning process.
Figure 5B:
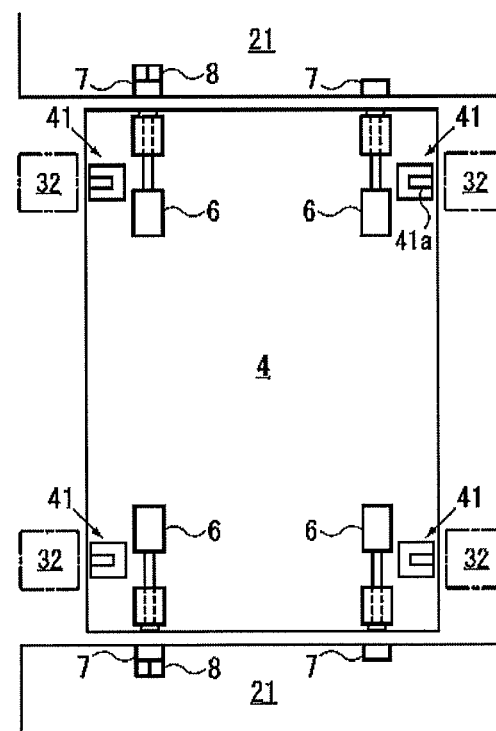
FIG. 5B is a diagram showing a guide roller retraction step in the cage positioning process.
Figure 5C:
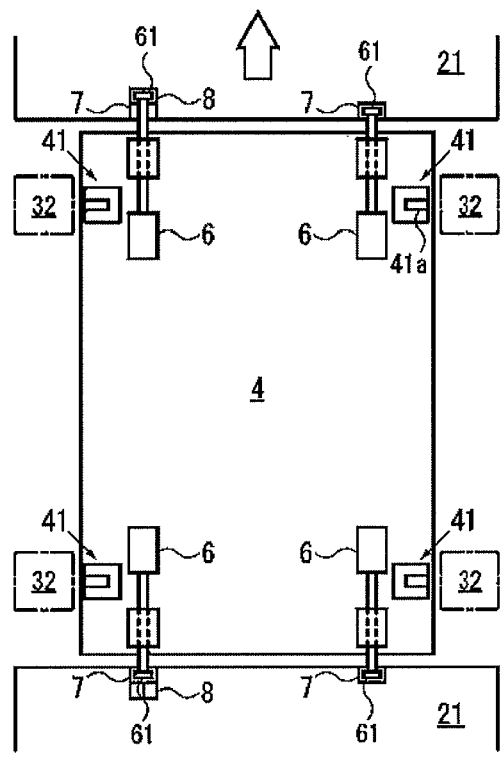
FIG. 5C is a diagram showing an outrigger extension step in the cage positioning process.
Figure 5D:
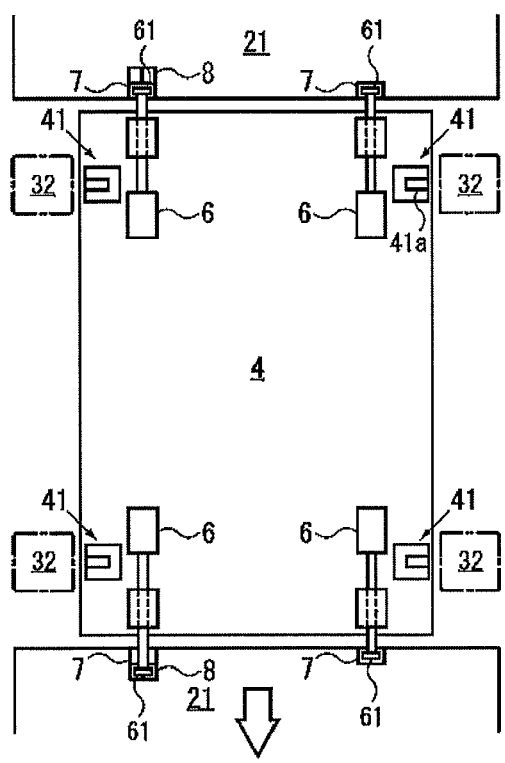
FIG. 5D is a diagram showing the outrigger extension step in the cage positioning process.

FIG. 5A is a diagram showing a cage stop step in a cage positioning process. FIG. 5B is a diagram showing a guide roller retraction step in the cage positioning process. FIG. 5C is a diagram showing an outrigger extension step in the cage positioning process. FIG. 5D is a diagram showing the outrigger extension step in the cage positioning process. In addition, the figure of the carriage 5 is omitted in the above drawings.

As shown in FIG. 5A, in a state where the cage 4 is transferred and stopped at the front of a storage rack 21, the guide rollers 41 of the cage 4 contact the masts 32. Subsequently, as shown in FIG. 5B, the guide rollers 41 are retracted, thereby separating the rollers 41a from the masts 32. In a case where the carriage will be transferred to the storage rack 21 in the side indicated by the arrow shown in FIG. 5C, one of the outriggers 6 is extended so that the wheel 61 is placed on the second engagement portion 8 disposed in the storage rack 21 in the side indicated by the arrow. The other three outriggers 6 are extended so that the wheels 61 are placed on the first engagement portions 7 of the storage racks 21 in both sides. Subsequently, the cage 4 is lowered, thereby engaging the outriggers 6 with the storage racks 21.

FIGS. 4B and 4C show a state where the wheel 61 of the outrigger 6 is placed on the first engagement portion 7. In addition, FIGS. 4D and 4E show a state where the wheel 61 of the outrigger 6 is placed on the second engagement portion 8. As shown in FIG. 5C, since only one outrigger 6 is engaged with (placed on) the second engagement portion 8 and the other outriggers 6 are engaged with (placed on) the first engagement portions 7, in the first engagement portions 7, the height h of each first engagement portion 7 is set so that the height position of the outrigger 6 positioned to the second engagement portion 8 is the same as the height positions of the other outriggers 6 placed on the first engagement portions 7. By this structure, even when the outriggers 6 are engaged with the storage racks 21, the cage 4 can be prevented from wobbling, and the carriage 5 can travel smoothly.

In a state where the outriggers 6 are engaged with the storage racks 21, since only one outrigger 6 is placed on the second engagement portion 8 capable of performing the positioning and the other outriggers 6 are placed on the first engagement portions 7, the cage 4 can be positioned based on the outrigger 6 engaged with the second engagement portion 8, and the position gap of the cage 4 can be absorbed by the outriggers 6 engaged with the first engagement portions 7. In other words, in a state where the outriggers 6 are engaged with the storage racks 21, only one outrigger 6 is engaged with the second engagement portion 8 capable of performing the positioning in the vertical and horizontal directions, and the other outriggers 6 are engaged with the first engagement portions 7 capable of performing the positioning in the vertical direction. The outriggers 6 are positioned by the first engagement portions 7 and the second engagement portion 8 in the vertical direction, whereby the cage 4 is positioned with respect to the storage rack 21 in the vertical direction, and the rails of the cage 4 and the rails 25 of the storage rack 21 are properly positioned with respect to each other in the vertical direction. In addition, the horizontal movement of the wheels 61 placed on the first engagement portions 7 is not regulated. Therefore, one outrigger 6 is positioned by the second engagement portion 8 in the horizontal direction, whereby the cage 4 is positioned with respect to the storage rack 21 in the horizontal direction, and the rails of the cage 4 and the rails 25 of the storage rack 21 are properly positioned with respect to each other in the horizontal direction. By the functions of the first engagement portions 7 and the second engagement portion 8, the rails of the cage 4 are properly positioned with respect to the rails 25 of the storage rack 21.

Furthermore, when positioning the outrigger 6 by the second engagement portion 8, the guide rollers 41 are separated from the masts 32. Thereby, when the cage 4 is positioned, the movement of the cage 4 is not restricted by the masts 32, and the positioning thereof can be performed freely.

In a case where the carriage 5 will be transferred to the storage rack 21 in the side indicated by the arrow shown in FIG. 5D, one of the outriggers 6 is extended so that the wheel 61 is placed on the second engagement portion 8 disposed in the storage rack 21 in the side indicated by the arrow. The other outriggers 6 are extended so that the wheels 61 are placed on the first engagement portions 7 of the storage racks 21 in both sides. Subsequently, the cage 4 is lowered, thereby engaging the outriggers 6 with the storage racks 21. In this way, the outrigger 6 is engaged with the second engagement portion 8 disposed in the side to which the carriage 5 will travel, whereby the rails 25 of the storage rack 21 and the rails of the cage 4 can be correctly positioned with respect to each other. That is, the occurrence of the position gaps in these rails can be prevented.

As shown in FIG. 2, the carriage 5 is placed on the rails (shown using chain lines in this drawing) disposed on the cage 4. Similarly to the cage 4, the carriage 5 is, for example, a frame structure composed of a plurality of frames. The carriage 5 includes a plurality of wheels 51, and some of the wheels 51 are configured to be capable of traveling on the rails by using drive units 52. In addition, a wheel 51 placed on one rail of a pair of rails may include an annular protrusion or groove to be guided by a groove or protrusion formed in the one rail (in this embodiment, a protrusion or groove is formed in the wheels 51 in the left side of the drawing). As the drive units 52, various units such as an electric motor, a belt mechanism, a chain sprocket mechanism, and a rack-and-pinion mechanism can be used. In addition, the drive units 52 may include reduction mechanisms. The carriage 5 includes a lifting device 53 to lift and lower the article A placed on the carriage 5 together with the palette P. The lifting device 53 includes, for example, a lifting support 53a disposed so as to be capable of extending and retracting in the approximately vertical direction, and a drive unit 53b to lift and lower the lifting support 53a. In this drawing, a hydraulic unit is shown as the drive unit 53b. In addition, the drive unit 53b may be an electric-driving type, and the lifting device 53 may be a pantograph type.

Figure 6A:
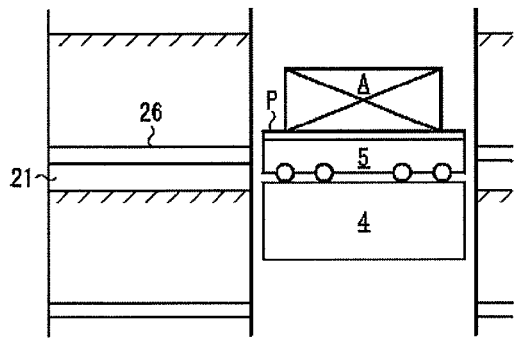
FIG. 6A is a diagram showing a cage stop step in an article loading process by an article transfer method related to the first embodiment of the present invention.
Figure 6B:
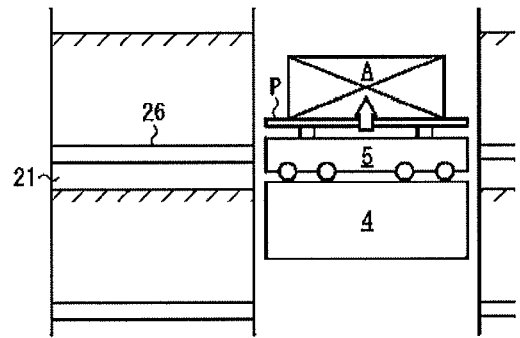
FIG. 6B is a diagram showing a lift-up step in the article loading process.
Figure 6C:
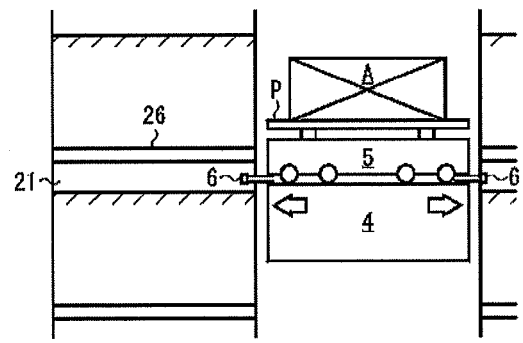
FIG. 6C is a diagram showing an outrigger extension step in the article loading process.
Figure 6D:
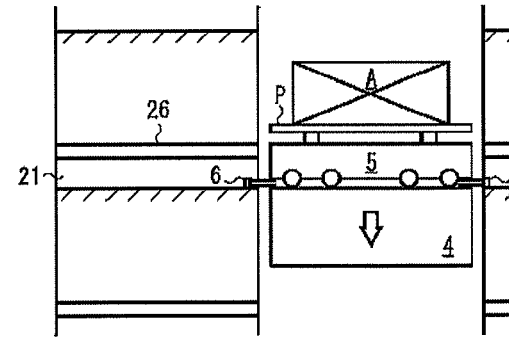
FIG. 6D is a diagram showing an outrigger engagement step in the article loading process.
Figure 6E:
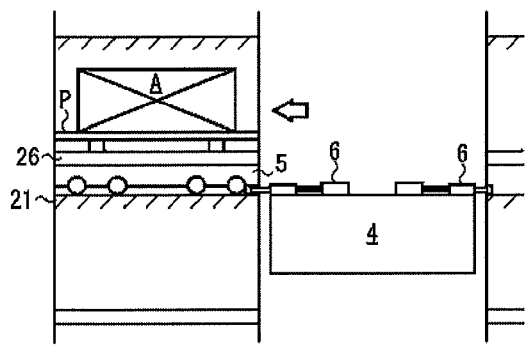
FIG. 6E is a diagram showing a carriage movement step in the article loading process.
Figure 6F:
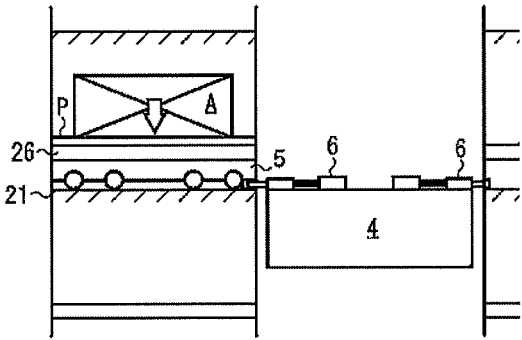
FIG. 6F is a diagram showing a lower-down step in the article loading process.
Figure 6G:
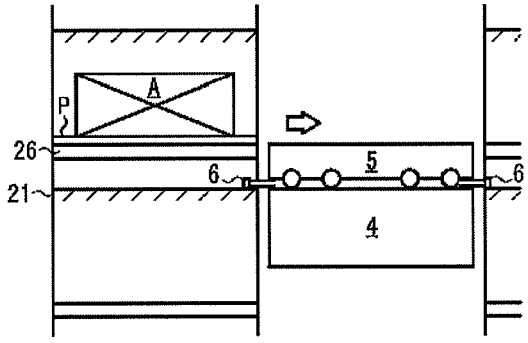
FIG. 6G is a diagram showing a carriage return step in the article loading process.
Figure 6H:
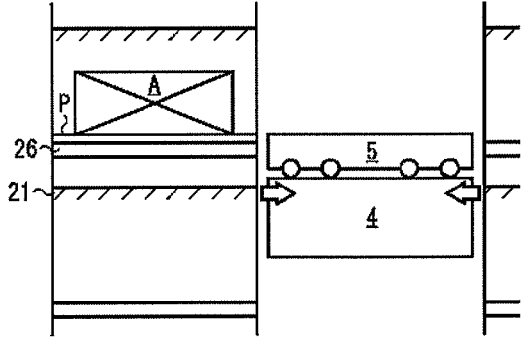
FIG. 6H is a diagram showing an outrigger retraction step in the article loading process.
Figure 7A:
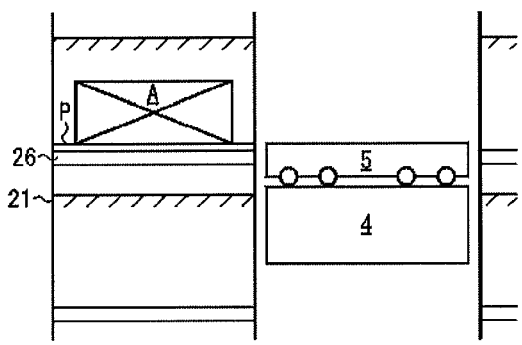
FIG. 7A is a diagram showing a cage stop step in an article unloading process by the article transfer method related to the first embodiment of the present invention.
Figure 7B:
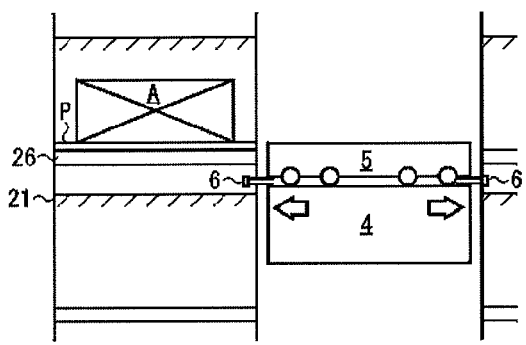
FIG. 7B is a diagram showing an outrigger extension step in the article unloading process.
Figure 7C:
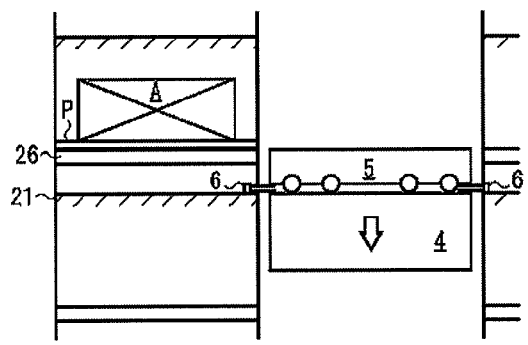
FIG. 7C is a diagram showing an outrigger engagement step in the article unloading process.
Figure 7D:
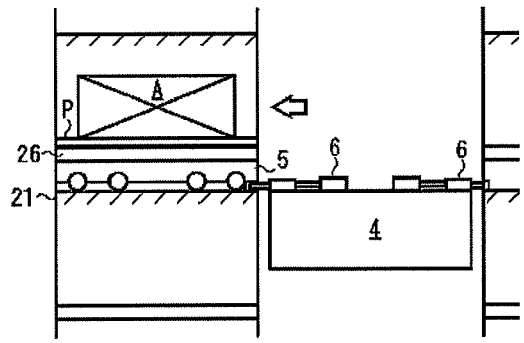
FIG. 7D is a diagram showing a carriage movement step in the article unloading process.
Figure 7E:
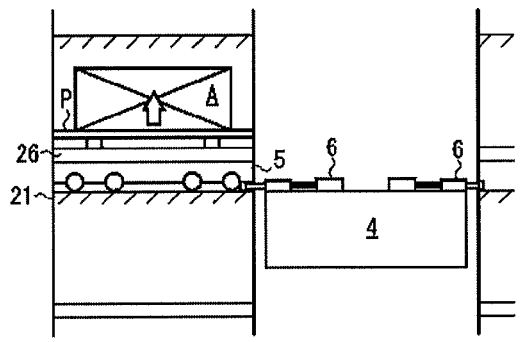
FIG. 7E is a diagram showing a lift-up step in the article unloading process.
Figure 7F:
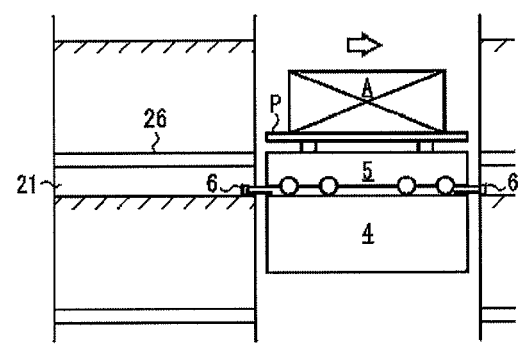
FIG. 7F is a diagram showing a carriage return step in the article unloading process.
Figure 7G:
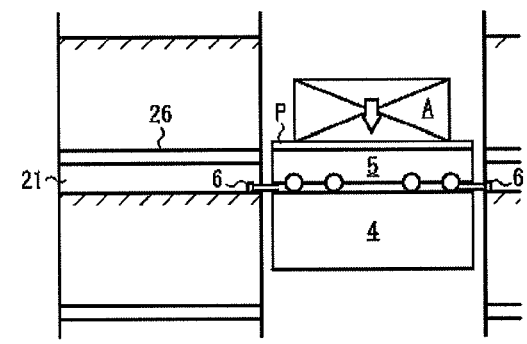
FIG. 7G is a diagram showing a lower-down step in the article unloading process.
Figure 7H:
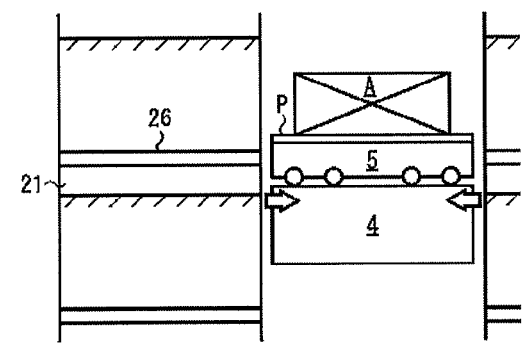
FIG. 7H is a diagram showing an outrigger retraction step in the article unloading process.

Next, an article transfer method using the article storage device 1 of the above first embodiment is described below. FIG. 6A is a diagram showing a cage stop step in an article loading process by an article transfer method related to the first embodiment of the present invention. FIG. 6B is a diagram showing a lift-up step in the article loading process. FIG. 6C is a diagram showing an outrigger extension step in the article loading process. FIG. 6D is a diagram showing an outrigger engagement step in the article loading process. FIG. 6E is a diagram showing a carriage movement step in the article loading process. FIG. 6F is a diagram showing a lower-down step in the article loading process. FIG. 6G is a diagram showing a carriage return step in the article loading process. FIG. 6H is a diagram showing an outrigger retraction step in the article loading process. FIG. 7A is a diagram showing a cage stop step in an article unloading process by the article transfer method related to the first embodiment of the present invention. FIG. 7B is a diagram showing an outrigger extension step in the article unloading process. FIG. 7C is a diagram showing an outrigger engagement step in the article unloading process. FIG. 7D is a diagram showing a carriage movement step in the article unloading process. FIG. 7E is a diagram showing a lift-up step in the article unloading process. FIG. 7F is a diagram showing a carriage return step in the article unloading process. FIG. 7G is a diagram showing a lower-down step in the article unloading process. FIG. 7H is a diagram showing an outrigger retraction step in the article unloading process.

As described above, the article storage device 1 shown in FIGS. 6A to 6H and 7A to 7H includes a warehouse 2 including storage racks 21 to store articles A, a crane 3 configured to be capable of moving along the warehouse 2, a cage 4 suspended from the crane 3 so as to be capable of going up and down, and a carriage 5 disposed on the cage 4 so as to be capable of traveling between the cage 4 and the storage racks 21. The cage 4 includes outriggers 6 configured to be capable of extending and retracting with respect to the storage racks 21 and to be capable of being engaged with the storage racks 21. Each of the storage racks 21 includes first engagement portions 7 disposed at portions with which the outriggers 6 are engaged, and a second engagement portion 8 disposed adjacent to one of the first engagement portions 7 in an extending and retracting direction of the outriggers 6. The second engagement portion 8 is configured to be capable of positioning one of the outriggers 6.

As shown in FIGS. 6A to 6H and 7A to 7H, the article transfer method related to this embodiment of the present invention includes a cage stop step of stopping the cage 4 at a position above the storage rack 21 to which an article A will be transferred, an outrigger extension step of extending the outriggers 6 so that one of the outriggers 6 in the side to which the carriage 5 is moved is placed on the second engagement portion 8 and the other outriggers 6 are placed on the first engagement portions 7, an outrigger engagement step of lowering the cage 4 and of placing the outriggers 6 on the first engagement portions 7 and the second engagement portion 8, thereby engaging the outriggers 6 with the storage racks 21, and a carriage movement step of causing the carriage 5 to travel so as to move to the storage rack 21, wherein the article A is transferred between the cage 4 and the storage rack 21 by moving the carriage 5.

Each step of the article loading process by the article transfer method related to the embodiment of the present invention shown in FIGS. 6A to 6H, and the article unloading process by the article transfer method related to the embodiment of the present invention shown in FIGS. 7A to 7H is described below in detail. In addition, the article loading process is a process to store an article A into a storage rack 21, and the article unloading process is a process to remove the article A stored in the storage rack 21 and to provide the article A to the outside.

The article loading process by the article transfer method related to the embodiment of the present invention includes the cage stop step shown in FIG. 6A, the lift-up step shown in FIG. 6B, the outrigger extension step shown in FIG. 6C, the outrigger engagement step shown in FIG. 6D, the carriage movement step shown in FIG. 6E, the lower-down step shown in FIG. 6F, the carriage return step shown in FIG. 6G, and the outrigger retraction step shown in FIG. 6H.

The cage stop step shown in FIG. 6A is a step in which the cage 4 is stopped at the front of a storage rack 21. The stop position of the cage 4 is set at a position above a storage rack 21 to which an article A will be transferred so that the outriggers 6 do not hit the storage rack 21 when extending the outriggers 6.

The lift-up step shown in FIG. 6B is a step in which a palette P on the carriage 5, on which the article A is placed, is lifted by the lifting device 53 (see FIG. 2). The palette P is lifted up so as to be disposed at a position above the supporting member 26 of the storage rack 21. In addition, in a case where the cage 4 has been transferred with lifting the palette P up in advance, the state after the lift-up step shown in FIG. 6B is achieved at the cage stop step shown in FIG. 6A.

The outrigger extension step shown in FIG. 6C is a step in which the outriggers 6 are extended to positions to be engaged with the storage racks 21. Specifically, the outriggers 6 are extended so that one of the outriggers 6 in the side to which the carriage 5 travels is placed on the second engagement portion 8, and the other outriggers 6 are placed on the first engagement portions 7 (see FIGS. 5C or 5D).

At this time, in a case where the cage 4 is configured to be capable of going up and down between the masts 32 constituting pillars of the crane 3 and includes the guide rollers 41 configured to be capable of contacting the masts 32 and to be capable of being separated from the masts 32, it is preferable that a guide roller retraction step of separating the guide rollers 41 from the masts 32 (see FIG. 5B) be inserted before or after the outrigger extension step shown in FIG. 6C.

The outrigger engagement step shown in FIG. 6D is a step in which the outriggers 6 are engaged with the storage racks 21. Specifically, the cage 4 is lowered and the outriggers 6 are placed on the first engagement portions 7 and the second engagement portion 8, thereby engaging the outriggers with the storage racks 21. At this time, one of the outriggers 6 is engaged with the second engagement portion 8 disposed in the storage rack 21 in the side to which the carriage 5 will travel. The other outriggers 6 are engaged with the first engagement portions 7.

The carriage movement step shown in FIG. 6E is a step in which the carriage 5 is moved from the cage 4 to the storage rack 21. As described above, the outriggers 6 are engaged with the storage racks 21, whereby the rails of the cage 4 and the rails 25 of the storage rack 21 can be correctly positioned with respect to each other, and the carriage 5 can be allowed to travel smoothly. Particularly, even when the article A is a heavy article, since the rails are positioned correctly, problems such as travel impossibility of the carriage 5, damage to devices and the like can be prevented.

The lower-down step shown in FIG. 6F is a step in which the palette P on the carriage 5, on which the article A is placed, is lowered. Specifically, the palette P is lowered so as to be transferred from the carriage 5 to the supporting member 26 of the storage rack 21. By this step, the article A is transferred from the carriage 5 to the storage rack 21 together with the palette P.

The carriage return step shown in FIG. 6G is a step in which the empty carriage 5 is returned onto the cage 4. Also in this case, since the rails of the cage 4 and the rails 25 of the storage rack 21 are correctly positioned with respect to each other, the carriage 5 can be allowed to travel smoothly.

The outrigger retraction step shown in FIG. 6H is a step in which the outriggers 6 are retracted, thereby releasing the cage 4 from the storage racks 21. Specifically, the cage 4 is made to go up to the stop position of the cage 4 shown in FIG. 6C, thereby separating the outriggers 6 from the first engagement portions 7 and the second engagement portion 8. Subsequently, as shown in FIG. 6H, the outriggers 6 are retracted. In this way, the outriggers 6 are made to go up slightly before retracting the outriggers 6, whereby the outriggers 6 can be prevented from being caught, the stress to the outriggers 6 can be minimized, and the damage thereto can be prevented. In addition, since the carriage 5 is empty and the weight thereof has been reduced at the outrigger retraction step in the article loading process, a step in which the cage 4 goes up may be omitted, and the outriggers 6 may be retracted without making the cage 4 go up.

The article unloading process by the article transfer method related to the embodiment of the present invention includes the cage stop step shown in FIG. 7A, the outrigger extension step shown in FIG. 7B, the outrigger engagement step shown in FIG. 7C, the carriage movement step shown in FIG. 7D, the lift-up step shown in FIG. 7E, the carriage return step shown in FIG. 7F, the lower-down step shown in FIG. 7G, and the outrigger retraction step shown in FIG. 7H.

The cage stop step shown in FIG. 7A is a step in which the cage 4 is stopped at the front of the storage rack 21 storing the article A which will be removed. The stop position of the cage 4 is set at a position above the target storage rack 21 so that the outriggers 6 do not hit the storage rack 21 when extending the outriggers 6.

The outrigger extension step shown in FIG. 7B is a step in which the outriggers 6 are extended to positions to be engaged with the storage racks 21. Specifically, the outriggers 6 are extended so that one of the outriggers 6 in the side to which the carriage 5 travels is placed on the second engagement portion 8, and the other outriggers 6 are placed on the first engagement portions 7 (see FIGS. 5C or 5D).

At this time, in a case where the cage 4 is configured to be capable of going up and down between the masts 32 constituting pillars of the crane 3 and includes the guide rollers 41 configured to be capable of contacting the masts 32 and to be capable of being separated from the masts 32, it is preferable that a guide roller retraction step of separating the guide rollers 41 from the masts 32 (see FIG. 5B) be inserted before or after the outrigger extension step shown in FIG. 7B.

The outrigger engagement step shown in FIG. 7C is a step in which the outriggers 6 are engaged with the storage racks 21. Specifically, the cage 4 is lowered and the outriggers 6 are placed on the first engagement portions 7 and the second engagement portion 8, thereby engaging the outriggers with the storage racks 21. At this time, one of the outriggers 6 is engaged with the second engagement portion 8 disposed in the storage rack 21 in the side to which the carriage 5 will travel. The other outriggers 6 are engaged with the first engagement portions 7.

The carriage movement step shown in FIG. 7D is a step in which the carriage 5 is moved from the cage 4 to the storage rack 21. As described above, the outriggers 6 are engaged with the storage racks 21, whereby the rails of the cage 4 and the rails 25 of the storage rack 21 can be correctly positioned with respect to each other, and the carriage 5 can be allowed to travel smoothly.

The lift-up step shown in FIG. 7E is a step in which the palette P placed on the supporting member 26 of the storage rack 21 is lifted together with the article A. Specifically, the palette P on which the article A is placed is lifted by using the lifting device 53 (see FIG. 2) of the carriage 5 moved onto the storage rack 21, and the palette P and the article A are lifted up from the storage rack 21. By this step, the article A can be transferred from the storage rack 21 to the carriage 5.

The carriage return step shown in FIG. 7F is a step in which the carriage 5 supporting the article A is returned onto the cage 4. Also in this case, since the rails of the cage 4 and the rails 25 of the storage rack 21 are correctly positioned with respect to each other, the carriage 5 can be allowed to travel smoothly. Particularly, even when the article A is a heavy article, since the rails are positioned correctly, problems such as travel impossibility of the carriage 5, damage to devices and the like can be prevented.

The lower-down step shown in FIG. 7G is a step in which the palette P on the carriage 5, on which the article A is placed, is lowered. Specifically, the palette P is lowered so as to be placed on the entire upper surface of the carriage 5. By this step, the article A is transferred from the storage rack 21 to the carriage 5 together with the palette P. In addition, in a case where the palette P has to be lifted at a destination (for example, the loading-unloading station 22, another storage rack 21 or the like) of the removed article A, the lower-down step may be omitted, and the next step may be started without lowering the palette P.

The outrigger retraction step shown in FIG. 7H is a step in which the outriggers 6 are retracted, thereby releasing the cage 4 from the storage racks 21. Specifically, the cage 4 is made to go up to the stop position of the cage 4 shown in FIG. 7B, thereby separating the outriggers 6 from the first engagement portions 7 and the second engagement portion 8. Subsequently, as shown in FIG. 7H, the outriggers 6 are retracted. In this way, the cage 4 is made to go up slightly before retracting the outriggers 6, whereby the outriggers 6 can be prevented from being caught, the stress to the outriggers 6 can be minimized, and the damage thereto can be prevented. Particularly, when removing the article, since the article A as a heavy article is placed and thereby the load to the outriggers 6 becomes great, it is preferable that the outriggers 6 be retracted after the step in which the cage 4 goes up.

According to the article storage device 1 and the article transfer method related to the present invention described above, the positioning is performed by one of the outriggers 6 which extend in the traveling direction of the carriage 5, and the other outriggers 6 are not held when performing the positioning. Therefore, the cage 4 as a whole can be positioned by positioning one of the outriggers 6, and the rails of the cage 4 and the rails 25 of the storage rack 21 can be easily positioned with respect to each other. Consequently, even when the articles A to be stored are heavy articles, the articles A can be transferred smoothly, and the article storage device 1 and the article transfer method suitable for the storage or transfer of heavy articles can be provided.

In a case where the cage 4 includes the guide rollers 41 to contact the masts 32, the guide rollers 41 are retracted so as to be separated from the masts 32 when positioning the cage 4. Therefore, when the outriggers 6 are positioned, the cage 4 is not held by the masts 32 or the guide rollers 41, and thereby the positioning of the cage 4 can be performed easily.

Figure 8A:
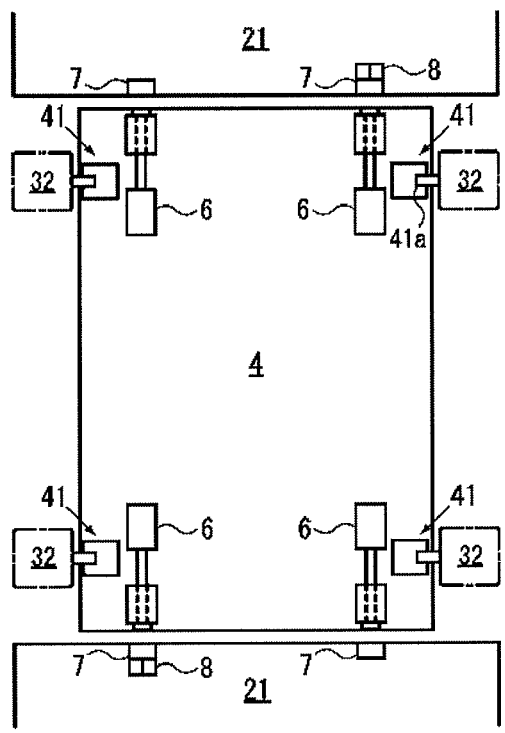
FIG. 8A is a plan view showing an article storage device related to a second embodiment of the present invention.
Figure 8B:
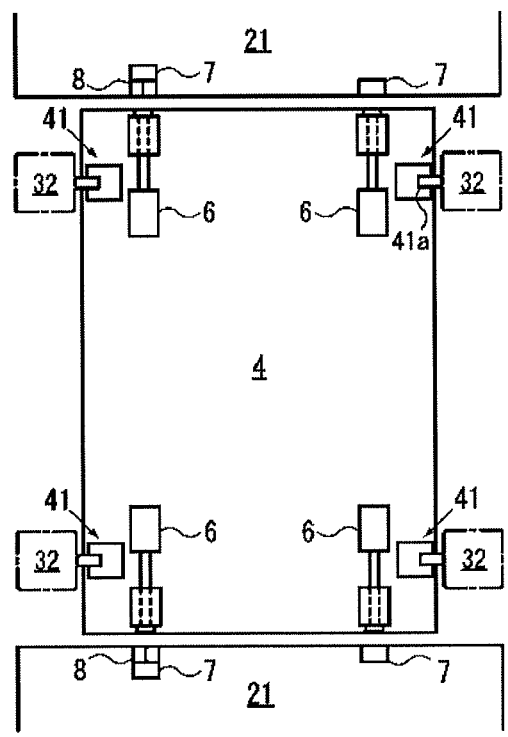
FIG. 8B is a plan view showing an article storage device related to a third embodiment of the present invention.
Figure 8C:
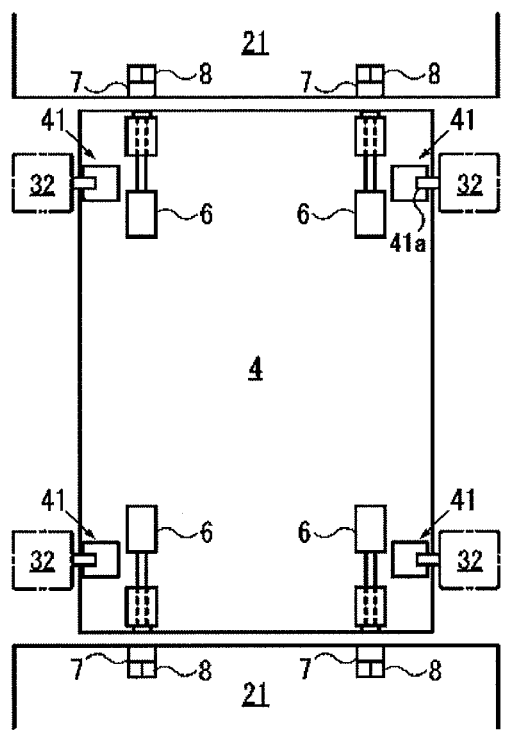
FIG. 8C is a plan view showing an article storage device related to a fourth embodiment of the present invention.
Figure 8D:
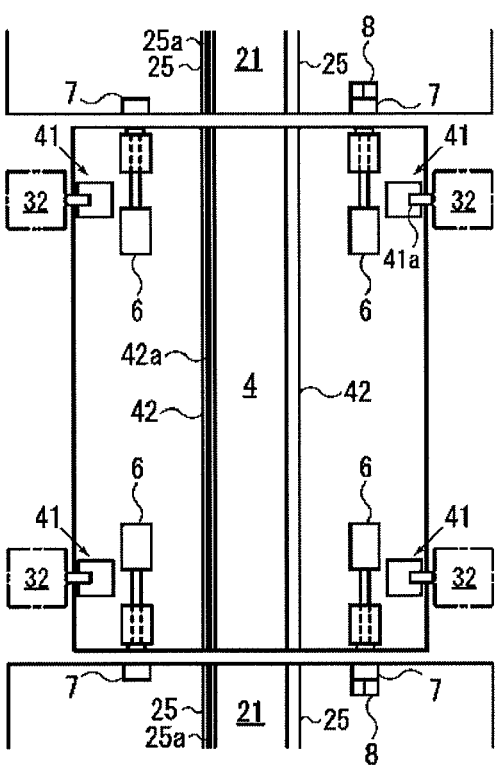
FIG. 8D is a plan view showing an article storage device related to a fifth embodiment of the present invention.

Finally, article storage devices related to other embodiments of the present invention are described below. FIG. 8A is a plan view showing an article storage device related to a second embodiment of the present invention. FIG. 8B is a plan view showing an article storage device related to a third embodiment of the present invention. FIG. 8C is a plan view showing an article storage device related to a fourth embodiment of the present invention. FIG. 8D is a plan view showing an article storage device related to a fifth embodiment of the present invention. In addition, the figure of the carriage 5 is omitted in the above drawings. Furthermore, the same structural elements as that of the article storage device 1 in the above first embodiment are provided with the same reference signs, and duplicate descriptions thereof are omitted.

In the embodiments shown in FIGS. 8A to 8D, the arrangement of the first engagement portion 7 and the second engagement portion 8 is changed. In the second embodiment shown in FIG. 8A, the arrangement of the first engagement portions 7 is the same as that of the first embodiment, and the second engagement portions 8 are disposed in a diagonal line of the cage. In the third embodiment shown in FIG. 8B, the positions of the first engagement portion 7 and the second engagement portion 8 adjacent to each other in the first embodiment are exchanged. Even when adopting these arrangements, the cage 4 can be correctly positioned by the outriggers 6 similarly to the first embodiment.

In the fourth embodiment shown in FIG. 8C, the second engagement portion 8 is disposed at each of positions adjacent to the first engagement portions 7. In this way, each engagement portion in the storage rack 21 is configured by the combination of the first engagement portion 7 and the second engagement portion 8, and thereby one outrigger 6 optionally selected from the outriggers 6 in the side to which the carriage 5 will travel can be engaged with the second engagement portion 8. Therefore, one outrigger 6 to be held by the second engagement portion 8 is selected alternately from the outriggers 6, whereby the loads to the outriggers 6 can be uniform, and the waste or damage of one of the outriggers 6 can be prevented.

In the fifth embodiment shown in FIG. 8D, the wheel 51 placed on one rail 42 of the pair of rails 42 in the cage 4 includes an annular protrusion (or groove) to be guided by a groove 42a (or protrusion) formed in the one rail 42, and each rail 25 in the storage racks 21 corresponding to the one rail 42 is also provided with a similar groove 25a (or protrusion). In this case, the second engagement portion 8 is disposed adjacent to the first engagement portion 7 in the side (the right side in the drawing) separated from the rail 25 including the groove 25a or the protrusion. By this structure, since the position in which the outrigger 6 is engaged with the second engagement portion 8 and the position in which the wheel 51 is engaged are separated from each other, the positioning accuracy of the carriage 5 may become slightly lower than that of the first embodiment, but the substantially same effect as the first embodiment can be obtained.

In the above first embodiment, in view of FIG. 8D, the wheel 51 placed on one rail 42 of the pair of rails 42 in the cage 4 includes an annular protrusion (or groove) to be guided by a groove 42a (or protrusion) formed in the one rail 42, each rail 25 in the storage racks 21 corresponding to the one rail 42 is also provided with a similar groove 25a (or protrusion), and the second engagement portion 8 is disposed adjacent to the first engagement portion 7 in the side (the left side in the drawing) near the rail 25 including the groove 25a or the protrusion. By this structure, since the position in which the outrigger 6 is engaged with the second engagement portion 8 and the position in which the wheel 51 is engaged are near to each other, the rail 42 of the cage 4 including the groove 42a or the protrusion can be correctly positioned to the rail 25 of the storage rack 21 including the groove 25a or the protrusion, and the carriage 5 including the wheel 51 having the annular protrusion or groove can be allowed to travel smoothly.

The present invention is not limited to the above embodiments, and various modifications can be performed within the scope not departing from the gist of the present invention.

INDUSTRIAL APPLICABILITY

The present invention can be applied to an article storage device and an article transfer method to perform the loading and unloading of articles.

The invention claimed is:
1. An article storage device comprising:
a warehouse including storage racks to store articles;
a crane configured to be capable of moving along the warehouse;
a cage suspended from the crane so as to be capable of going up and down; and
a carriage disposed on the cage so as to be capable of traveling between the cage and the storage racks,
wherein the cage includes outriggers configured to be capable of extending and retracting with respect to the storage racks and to be capable of being engaged with the storage racks,
each of the storage racks includes first engagement portions disposed at portions with which the outriggers are engaged, and a second engagement portion disposed adjacent to one of the first engagement portions in an extending and retracting direction of the outriggers, the second engagement portion is configured to be capable of positioning one of the outriggers, and
the article storage device is configured so that one of the outriggers is engaged with the second engagement portion disposed in a side to which the carriage travels, and the others of the outriggers are engaged with the first engagement portions,
wherein the cage is configured to be capable of going up and down between masts constituting pillars of the crane, and includes guide rollers configured to be capable of contacting the masts and to be capable of being separated from the masts, and
the guide rollers are configured to move to separation positions disposed apart from the masts when one of the outriggers is positioned on the second engagement portion,
wherein each of the guide rollers includes
a roller capable of rotating in a state of contacting one of the masts,
an arm supporting the roller rotatably,
a supporting member rotatably supporting a first end portion of the arm on an opposite side from a second end portion of the arm supporting the roller, and
a drive unit to pivot the arm between a contacting position and a separated position of the roller, and
wherein the supporting member is provided on the cage, and the arm links the roller and the supporting member.
2. The article storage device according to claim 1, wherein a wheel is disposed at each tip of the outriggers, and one of the outriggers is configured to be engaged with each of one first engagement portion and the second engagement portion through the wheel.
3. The article storage device according to claim 1, wherein the second engagement portion includes a V-shape groove capable of positioning one of the outriggers.
4. The article storage device according to claim 1, wherein the first engagement portions are configured so that a height position of one of the outriggers positioned to the second engagement portion is the same as height positions of the others of the outriggers placed on the first engagement portions.
5. The article storage device according to claim 1, wherein the storage racks are disposed on both sides of the crane.
6. An article transfer method in an article storage device that includes a warehouse including storage racks to store articles, a crane configured to be capable of moving along the warehouse, a cage suspended from the crane so as to be capable of going up and down, and a carriage disposed on the cage so as to be capable of traveling between the cage and the storage racks,
wherein the cage includes outriggers configured to be capable of extending and retracting with respect to the storage racks and to be capable of being engaged with the storage racks,
each of the storage racks includes first engagement portions disposed at portions with which the outriggers are engaged, and a second engagement portion disposed adjacent to one of the first engagement portions in an extending and retracting direction of the outriggers, and the second engagement portion is configured to be capable of positioning one of the outriggers,
the article transfer method comprising:
a cage stop step of stopping the cage at a position above a storage rack to which an article is transferred;
an outrigger extension step of extending the outriggers so that one of the outriggers in a side to which the carriage travels is placed over the second engagement portion and the others of the outriggers are placed over the first engagement portions;

an outrigger engagement step of lowering the cage and of placing the outriggers on the first engagement portions and the second engagement portion, thereby engaging the outriggers with the storage racks; and a carriage movement step of making the carriage travel from the cage and of moving the carriage to the storage rack, wherein the article is transferred between the cage and the storage rack by movement of the carriage, and wherein the cage is configured to be capable of going up and down between masts constituting pillars of the crane, and includes guide rollers configured to be capable of contacting the masts and to be capable of being separated from the masts, and each of the guide rollers includes
- a roller capable of rotating in a state of contacting one of the masts,
- an arm supporting the roller rotatably,
- a supporting member rotatably supporting a first end portion of the arm on an opposite side from a second end portion of the arm supporting the roller, and
- a drive unit to pivot the arm between a contacting position and a separated position of the roller, wherein the article transfer method further comprises a guide roller retraction step, before or after the outrigger extension step, of moving the guide rollers to separation positions disposed apart from the masts, and wherein the supporting member is provided on the cage, and the arm links the roller and the supporting member.

7. An article storage device comprising:

a crane configured to travel;

a cage suspended from the crane and including outriggers;

a storage rack disposed based on a traveling direction of the crane and including a first engagement portion and a second engagement portion, the first engagement portion being capable of positioning the outriggers in a vertical direction, the second engagement portion being capable of positioning the outriggers in vertical and horizontal directions; and a carriage disposed on the cage and configured to travel from a cage-side toward a storage rack-side, wherein the cage is configured to be capable of going up and down between masts constituting pillars of the crane, and includes guide rollers configured to be capable of contacting the masts and to be capable of being separated from the masts, and the guide rollers are configured to move to separation positions disposed apart from the masts when one of the outriggers is positioned on the second engagement portion, wherein each of the guide rollers includes
- a roller capable of rotating in a state of contacting one of the masts,
- an arm supporting the roller rotatably,
- a supporting member rotatably supporting a first end portion of the arm on an opposite side from a second end portion of the arm supporting the roller, and
- a drive unit to pivot the arm between a contacting position and a separated position of the roller, and wherein the supporting member is provided on the cage, and the arm links the roller and the supporting member.

8. The article storage device according to claim 7, wherein the second engagement portion is disposed adjacent to the first engagement portion in an extending and retracting direction of the outriggers.

9. The article storage device according to claim 7, wherein the storage rack is disposed along the traveling direction of the crane.

10. The article storage device according to claim 7, further comprising:

another storage rack disposed on an opposite side of a moving path of the crane from a side of the moving path of the crane on which the storage rack is disposed.

* * * * *